United States Patent [19]
Sekine

[11] Patent Number: 6,118,781
[45] Date of Patent: Sep. 12, 2000

[54] METHOD OF CHECKING INFORMATION RELATING TO CONNECTIONS OF A MULTISTAGE SWITCH

[75] Inventor: Yasuharu Sekine, Tokyo, Japan

[73] Assignee: NEC Corporation, Tokyo, Japan

[21] Appl. No.: 09/079,193

[22] Filed: May 15, 1998

[30] Foreign Application Priority Data

May 16, 1997 [JP] Japan ................................. 9-143546

[51] Int. Cl.[7] ........................... H04L 12/50; H04Q 11/00
[52] U.S. Cl. ...................... 370/360; 370/380; 370/387; 370/388; 340/826
[58] Field of Search ................................. 370/217, 218, 370/225, 248, 250, 351, 355, 357, 360, 362–365, 380, 381, 384, 386–388; 340/825.29, 825.03, 826, 825.8

[56] References Cited

U.S. PATENT DOCUMENTS

| | | | |
|---|---|---|---|
| 4,991,168 | 2/1991 | Richards | 370/381 |
| 5,369,400 | 11/1994 | Bowdon | 340/825.8 |
| 5,430,716 | 7/1995 | Pawelski | 370/388 |
| 5,751,764 | 5/1998 | Meyer et al. | 370/380 |
| 5,917,426 | 6/1999 | Yoshifuji | 370/388 |
| 5,982,770 | 11/1999 | Sekine | 370/360 |

FOREIGN PATENT DOCUMENTS 8-320835  12/1996  Japan .

*Primary Examiner*—Seema S. Rao
*Attorney, Agent, or Firm*—Sughrue, Mion, Zinn, Macpeak & Seas, PLLC

[57] ABSTRACT

A multistage switch has an M×N switch size selectively connecting M incoming lines and N outgoing lines and consists of S stages of discrete switches each having a switch unit, wherein the discrete switches are permanently cross-connected in accordance with a prescribed rule. Stored connection information regarding the overall multistage switch and the states of connection of the switch units of the discrete switches are retrieved. Then, utilizing the fact that an output terminal of a switch in a cth (where $c \leq S-1$) stage of the multistage switch is to be logically connected to an input terminal of a switch in a (c+1)th stage, connection information relating to the overall switch is generated from the results of retrieval. The generated connection information relating to the overall multistage switch is compared with connection information that has been stored in memory in advance, whereby a connection path that has been set for each discrete switch is prevented from being severed accidentally.

5 Claims, 9 Drawing Sheets

METHOD OF CHECKING INFORMATION RELATING TO CONNECTIONS OF A MULTISTAGE SWITCH

FIELD OF THE INVENTION

This invention relates to a system or method of checking information relating to the connections of a multistage switch.

More particularly, the invention relates to a method of checking the validity of connection information that has been stored in the memory of a multistage matrix switch. Description of the Related Art

BACKGROUND OF THE INVENTION

The art disclosed in the specification of Japanese Patent Kokai Publication JP-A-8-320835 is an example of the related prior art. Specifically, FIG. 7 illustrates a system of checking information relating to the connections of a 3-stage switch having a switch size of M×N in which M incoming lines and N outgoing lines are selectively connected, where M and N represent natural numbers.

As shown in FIG. 7, the switch section of this 3-stage switch includes P discrete switches $11, \ldots, 1K, \ldots, 1P$ (where P=M/m) of switch size m×r each selectively connecting m incoming lines and r outgoing lines (where m, r are natural numbers and $m \leq M$ holds) and belonging to a primary switch group 1; R discrete switches $21, \ldots, 2A, \ldots, 2R$ each selectively connecting p incoming lines and q outgoing lines and belonging to a secondary switch group 2; Q discrete switches $31, \ldots, 3K, \ldots, 3Q$ (where Q=N/n) each selectively connecting r incoming lines and n outgoing lines and belonging to a tertiary switch group 3; and a main controller 4 for controlling connections through the primary, secondary and tertiary switches 1, 2 and 3, respectively.

The controller 4 has a memory 41 for storing information relating to the connections of each discrete switch.

The discrete switches belonging to each discrete switch group have a switch unit for connecting one of a plurality of input terminals and one of a plurality of output terminals, and a switch controller for connecting this switch unit with the memory 41.

By way of example, as shown in FIG. 8, a primary switch 1K which belongs to the primary switch group 1 incorporates a switch unit 1K1 and a switch controller 1K2.

Similarly, secondary switches 2A, 2B which belong to the secondary switch group 2 have switch units 2A1, 2B1, respectively, and switch controllers 2A2, 2B2, respectively. Likewise, tertiary switches 3H, 3K which belong to the tertiary switch group 3 have switch units 3H1, 3K1, respectively, and switch controllers 3H2, 3K2, respectively.

The switch controller 1K2 of the primary switch 1K is connected to the main controller 4 by a control line 62. The switch controllers of the other discrete switches are connected to he main controller by control lines in a similar manner.

The manner in which input and output terminals of each discrete switch are connected will be described with reference to FIG. 9.

An ath $(1 \leq a \leq r)$ output terminal 1Kao of the Kth $(1 \leq K \leq P)$ switch 1K of primary switch group 1 is connected to a kth $(1 \leq k \leq p)$ input terminal 2Aki of the Ath $(1 \leq A \leq R)$ switch 2A of secondary switch group 2 by a signal line 51. An hth $(1 \leq h \leq q)$ output terminal 2Aho of this switch 2A is connected to an ath $(1 \leq a \leq r)$ input terminal 3Hai of the Hth $(1 \leq H \leq Q)$ switch 3H of tertiary switch group 3 by a signal line 53. Further, a kth $(1 \leq k \leq p)$ output terminal 2Ako of the switch 2A is connected to an ath input terminal 3Kai of the Kth $(1 \leq K \leq Q)$ switch 3K of tertiary switch group 3 by a signal line 54.

Further, a bth $(1 \leq b \leq r)$ output terminal 1Kbo of the switch 1K is connected to a kth input terminal 2Bki of the Bth $(1 \leq B \leq R)$ switch 2B of secondary switch group 2 by a signal line 52.

Further, an hth output terminal 2Bho of the Bth switch 2B of secondary group 2 is connected to a bth input terminal 3Hbi of the switch 3H by a signal line 55, and a kth output terminal 2Bko of the switch 2B is connected to a bth input terminal 3Kbi of the switch 3K by a signal line 56.

Accordingly, in the arrangement illustrated in FIG. 7, the output terminals 1~r of the first switch 11 in primary switch group 1 are connected to the first input terminals (1) of the 1st~rth switches 21~2R, respectively, of secondary switch group 2.

Similarly, the output terminals 1~q of the first switch 21 in secondary switch group 2 are connected to the first input terminals (1) of the switches 31~3Q, respectively, of tertiary switch group 3.

Thus, the output terminals of each discrete switch are cross-connected to the input terminals of the switches of the next stage.

A method of connecting paths in a 3-stage switch having such a construction will now be described with reference to FIG. 9.

In a case where there is a request to connect an input terminal X (where $X \leq M$) of the overall 3-stage switch and an output terminal Y (where $Y \leq N$), the main controller 4 computes that the input terminal X corresponds to an input terminal α of the Kth switch 1K of primary switch group 1 and that the output terminal Y corresponds to an output terminal β of the Hth switch 3H of tertiary switch group 3. By using the memory 41, the status of use of output terminal β of switch 3H is detected and the following processing is executed based upon the results of detection:

(1) In a case where the output terminal β of switch 3H is currently in use, an input terminal of the 3-stage switch that will make the connection to β (or Y) is retrieved. If the retrieved input terminal is X, the status is made "already connected" because the path for which connection was requested has already been connected. If the retrieved input terminal is different from X, then the status is made "connection impossible".

(2) In a case where the output terminal β of switch 3H is not in use, the main controller 4 retrieves from the memory 41 the states of use of output terminals 1~r of switch 1K of primary switch group 1 successively starting from the first output terminal.

For example, if 1st~(a−1)th output terminals of switch 1K are in use and the ath output terminal 1Kao is not use, the main controller 4 next retrieves the status of use of output terminal 2Aho of switch 2A of secondary switch group 2 connected to switch 3H of tertiary switch group 3 to which output terminal β belongs.

If this output terminal 2Aho is not in use, a path connecting the input terminal X and output terminal Y of the 3-stage switch can be acquired by connecting input terminal 1Kαi and output terminal 1Kao of switch 1K of primary switch group 1, input terminal 2Aki and output terminal 2Aao of switch 2A of second switch group 2, and input terminal 3Hai and output terminal 3Hβo of switch 3H of tertiary switch group 3. Accordingly, instructions for connecting the input and output terminals of the discrete switches along the retrieved path are transmitted to the switch controllers of the discrete switches.

In a case where each discrete switch executes the connection of the requested path to connect the input and output terminals normally, the status "normal end" is sent back to the main controller 4.

In a case where the path has been connected as requested, the main controller 4 saves the connection information (the switch numbers of the discrete switches, the input terminal numbers and the output terminal numbers of the discrete switches), which has been set for each of the discrete switches, in the memory 41.

In a case where the output terminal 2Aho of switch 2A is in use, on the other hand, the main controller 4 retrieves the status of use of the bth (a<b) output terminal 1Kbo of switch 1K. If this output terminal is not in use, the main controller next retrieves the status of use of the hth output terminal 2Bho of switch 2B connected to switch 3H. The main controller 4 repeats the operation described above until a usable output terminal of a primary switch and output terminal of a secondary switch are found.

A method of checking the connection information of such a multistage switch according to the prior art is as follows: Before generating a required connection instruction for each discrete switch, a check is made in regard to the discrete switch connection information that has been stored in the memory 41. Specifically, the fact that the discrete switches constructing the multiple stages are permanently connected in accordance with a prescribed rule is utilized to check, for each connection path, whether the output terminal number of a switch of a cth (c≦S−1) stage of the multistage switch and the input terminal number of a switch of the (c+1)th stage are capable of being logically connected, and to check whether the input terminal number and output terminal number of each discrete switch that have been stored in the memory unit as well as the switch number in the multistage switch fall within appropriate limits, thereby checking the logical normality of the multistage switch connection information that has been stored in the memory.

If the result of the logical check of the connection information is "normal", then, in regard to a path X-Y for which connection has been requested anew, the main controller 4 retrieves output terminals, which are not in use, based upon the connection information in memory 41 and generates a connection instruction each discrete switch is required to execute. Consequently, the logical validity of the connection information is assured. Furthermore, in a case where the result of the connection from the switch controller of each discrete switch is indicative of "normal end", the main controller 41 verifies that the path for which connection is requested has been set reliably for each discrete switch and adds the information indicative of the input and output terminals for which the path has been set onto the connection information in the memory 41.

SUMMARY OF THE DISCLOSURE

In the course of investigations toward the present invention, various problems have been encountered. Namely the above-described conventional method of checking multistage-switch connection information that has been stored in the memory involves a number of problems, which will now be set forth.

(1) The first problem is that if a request for connecting input and output terminals of the multistage switch is issued under conditions in which the connection information of the overall multistage switch stored in the memory unit of the main controller does not coincide with the connection states set for the switch units of each of the discrete switches, there will be cases where a path that has already been set for each discrete switch will be severed.

The reason for this is that the main controller, in response to a request to connect input and output terminals of the multistage switch, retrieves a connectable path based upon connection information in the memory that does not match connection paths actually set for the switch units of each of the discrete switches. In certain cases, therefore, there are instances where the main controller newly sets another path for an output terminal that is already being used.

(2) The second problem regards a case where the control lines connecting the main controller with the controllers of the discrete switches are severed or a case where the controllers of the discrete switches are reset. In order to match the connection information of the main controller with the connection states of the discrete switches, the connection information in the memory of the main controller is overwritten on each discrete switch after communication between the main controller and the switch controllers is restored. However, if the overwriting of the connection information is initiated under conditions in which the connection information of the multistage switch that has been stored in the memory does not match the connection paths that have been set for the switch units of the discrete switches, there will in some cases be instances where a path that has already been set for a discrete switch will be severed.

The reason for this is that since connection instructions different from the connection states of the discrete switches are overwritten on the discrete switches, there will in some cases be instances where a path different from an already established path is set.

Accordingly, it is an object of the present invention to provide a system or method of checking connection information of a multistage switch in which multistage-switch connection information that has been set in a memory is compared with connection paths set for the switch units of discrete switches, and inadvertent severance of a connection path, which has been set for the discrete switches, caused by non-agreement between the connection information and connection path is prevented.

Further objects of the present invention will become apparent in the entire disclosure.

According to one aspect of the present invention, there is provided a system of checking connection information of a multistage switch having an M×N switch size selectively connecting M incoming lines and N outgoing lines (where M, N are natural numbers) and having S stages (where S is a natural number) of discrete switches, wherein the discrete switches are permanently cross-connected in accordance with a prescribed rule, said system comprising:

means for retrieving connection information of the overall multistage switch that has been stored in a memory storing connection information relating to each discrete switch and to the overall multistage switch, as well as connection states of switch units of each of the discrete switches;

means for generating connection information of the overall switch from results of retrieval by utilizing the fact that an output terminal of a switch in a cth (where c≦S−1) stage of the multistage switch is to be logically connected to an input terminal of a switch in a (c+1)th stage; and means for comparing the generated connection information of the overall multistage switch and connection information that has been stored in the memory in advance;

wherein a connection path that has been set for each discrete switch is prevented from being severed accidentally.

According to another aspect of the present invention, the foregoing object is attained by providing a system of checking connection information of a multistage switch, wherein the multistage switch generally includes: a switch section, a memory for storing connection information and a main controller. The switch section has an M×N switch size selectively connecting M incoming lines and N outgoing lines (where M, N are natural numbers) and consisting of S stages (where S is a natural number) of discrete switches, wherein the discrete switches are permanently cross-connected in accordance with a prescribed rule.

The memory stores connection information relating to each discrete switch and to the multistage switch.

The main controller, in response to a request to the multistage switch for connection of a path connecting an input terminal number a and an output terminal b (where $a \leq M$, $b \leq N$), retrieves, based upon the connection information that has been stored in the memory, states of use of input terminal numbers and output terminal numbers of each of the discrete switches and a connectable connection path through the multistage switch, transmits connection instructions to switch controllers of respective ones of the discrete switches based upon results of retrieval, receives results of execution of path connection from the switch controllers of the discrete switches, and updates the connection information, which has been stored in the memory, based upon the results of execution received.

The multistage switch of switch size M×N is composed of discrete switches each having a switch size of mS×nS (where $mS \leq M$, $nS \leq N$) selectively connecting mS incoming lines and nS outgoing lines (where mS, nS are natural numbers).

Each discrete switch includes a switch unit of the switch size mS×nS, and a switch controller for managing connection information of the switch unit, receiving a connection instruction from the main controller and transmitting results of connection to the main controller via a control line connected to the main controller.

The system is constructed as follows: the switch controller of each discrete switch retrieves an input terminal number mS of an input terminal that is connected to an output terminal number nS of the switch unit, retrieves input terminal numbers of connected input terminals with regard to all output terminals of the switch unit and adopts results of retrieval as the connection information of the discrete switch;

The main controller reads the connection states of each of the discrete switches constituting the M×N multistage switch out of the switch controllers of all of the discrete switches, and retrieves, based upon the connection states of each of the discrete switches, the input terminal number a of the input terminal of the multistage switch that is connected to the output terminal number b of the output terminal of the multistage switch, as well as a connection path through the multistage switch, by utilizing the fact that an output terminal of a switch in a cth (where $c \leq S-1$) stage is capable of being logically connected to an input terminal of a switch in a (c+1)th stage;

The main controller repeats processing for retrieval of input terminal numbers of connected input terminals and connection paths with regard to all output terminals of the multistage switch, and generates connection information relating to the overall multistage switch based upon results of retrieval; and The main controller compares the connection information of the overall multistage switch retrieved and generated based upon the connection state of each discrete switch with connection information of the overall multistage switch stored in the memory in advance.

PREFERRED EMBODIMENTS

The principles and operation of the present invention constructed as set forth above will now be described.

Connection information relating to an S-stage (where S is a natural number) multistage switch is stored in a memory. The switch controller of each discrete switch of the multistage switch performs the operation set forth below:

(1) in a case where a connectable path is retrieved, based upon connection information relating to each discrete switch that has been stored in the memory, in response to a request to connect input and output terminals of the multistage switch, and (2) in a case where communication failure between a main controller and a switch controller of a discrete switch is restored and the connection information is overwritten onto each discrete switch for the purpose of matching the connection information in the memory and connection paths through the discrete switches.

The switch controller of each discrete switch retrieves input terminal numbers of input terminals connected to all output terminals of the switch unit and adopts the results of retrieval as the status of connection of the discrete switch. The main controller of the multistage switch reads the connection states of each of the discrete switches constituting the multistage switch out of the switch controllers of all of the discrete switches and retrieves, based upon the connection information of each of the discrete switches, the input terminal number of an input terminal of the multistage switch that is connected to the output terminal number of an output terminal of the multistage switch by utilizing the fact that an output terminal number of a switch in a cth (where $c \leq S-1$) stage is capable of being logically connected to an input terminal number of a switch in a (c+1)th stage. The main controller repeats processing for retrieval of input terminal numbers of connected input terminals and connection paths with regard to all output terminals of the multistage switch and generates connection information relating to the overall multistage switch based upon the results of retrieval. The main controller compares the connection information of the overall multistage switch retrieved and generated based upon the connection state of each discrete switch with connection information of the overall multistage switch stored in the memory beforehand. As a result, agreement between the status of the connection of each discrete switch and the connection information of the overall multistage switch that has been stored in the memory is verified.

In the aforesaid case (1), therefore, a connectable path is retrieved based upon the connection information in the memory in response to a request to connect input and output terminals of the multistage switch and the severance of an already established connection path, which may be caused by establishing a new path to an output terminal that is already being used, can be prevented.

In the aforesaid case (2), it is possible to prevent connection paths, which have already been established for the discrete switches, from being severed owing to overwriting of connection information, which does not agree with the connection states established for the discrete switches, from the memory.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A mode for practicing the present invention will be described with reference to the accompanying drawings.

(1) Configuration

A multistage switch according to this mode of practicing the present invention has a switch size of N×M for selectively connecting M incoming lines and N outgoing lines, where M and N represent natural numbers.

Each discrete switch group of the multistage switch has a plurality of switch units, and each of the discrete switches has a plurality of input terminals and a plurality of output terminals.

Figure 1:
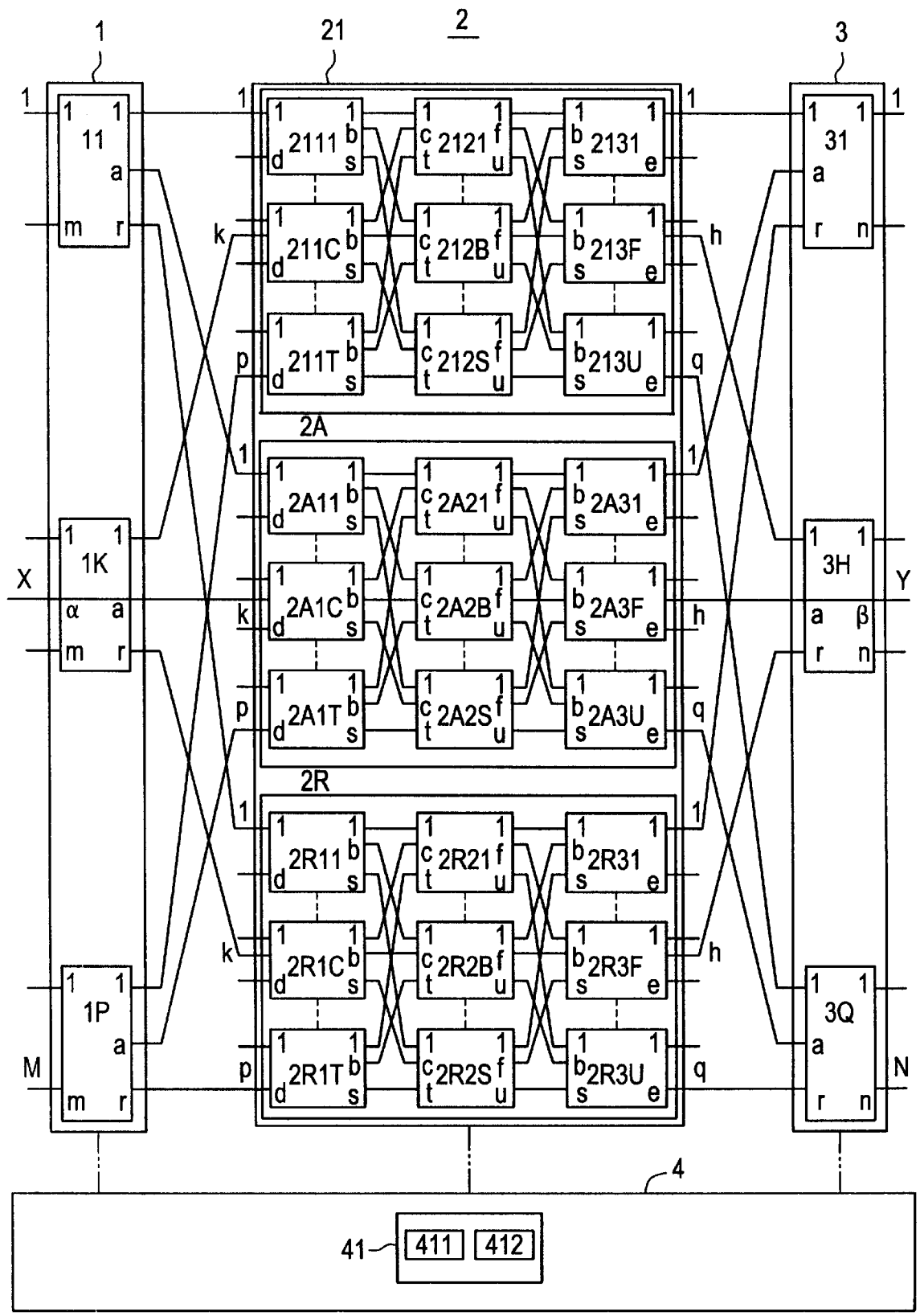
FIG. 1 is a diagram useful in describing the connections of signal lines in a multistage switch for practicing the present invention.

FIG. 1 is a diagram showing an example of the configuration of this mode of practicing the invention. Specifically, FIG. 1 illustrates a 5-stage switch as an example of multistage switch.

As shown in FIG. 1, the 5-stage switch includes P discrete switches (where P=M/m) of switch size m×r each selectively connecting m incoming lines and r outgoing lines (where m, r are natural numbers and $m \leq M$ holds) and belonging to a primary switch group 1; R switch groups each selectively connecting p incoming lines and q outgoing lines and belonging to a secondary switch group 2; Q discrete switches (where Q=N/n) each selectively connecting r incoming lines and n outgoing lines and belonging to a tertiary switch group 3; and a main controller 4 for controlling connections through the primary, secondary and tertiary switches 1, 2 and 3.

Figure 2:
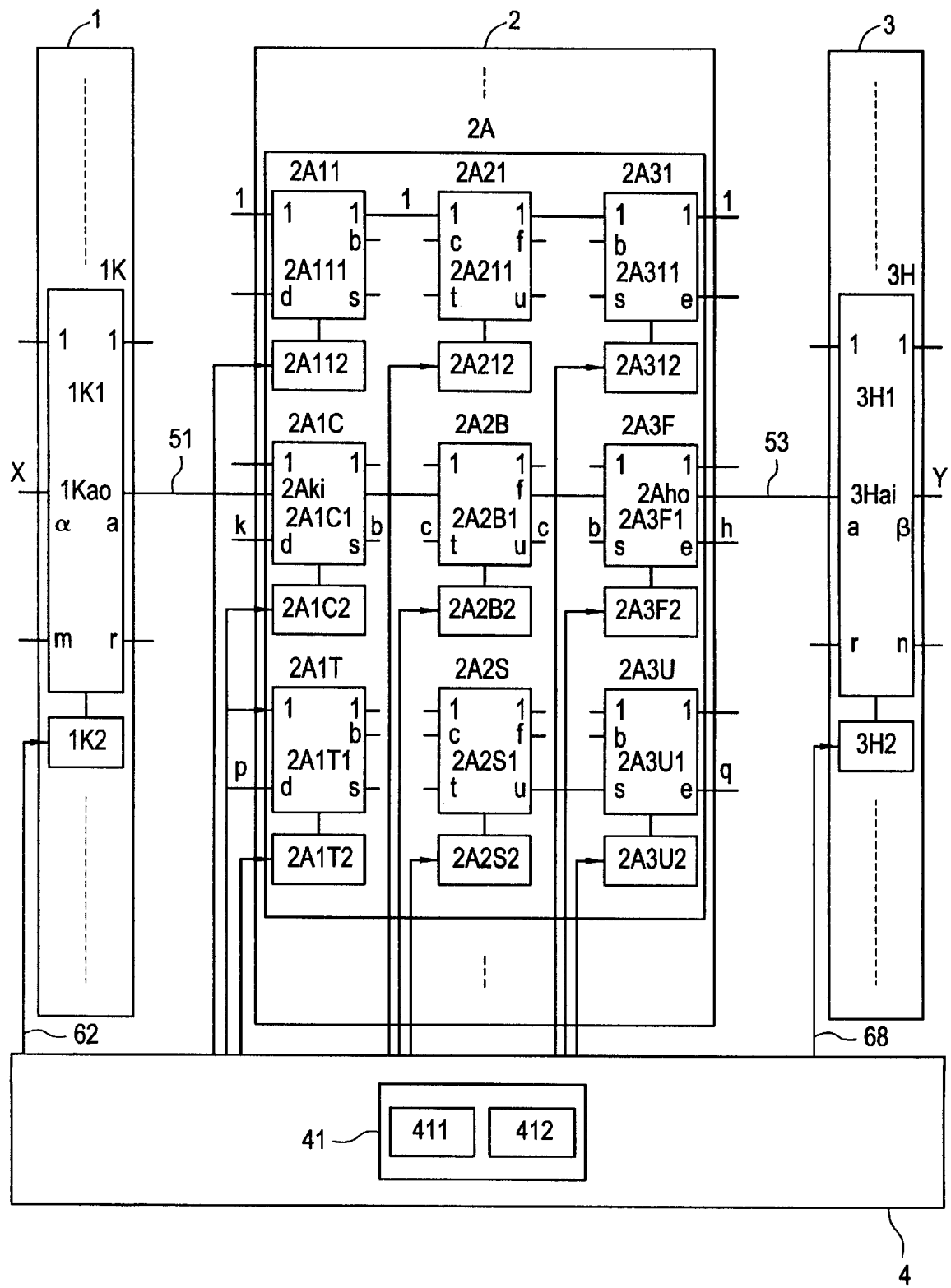
FIG. 2 is a diagram useful in describing the details of construction of a multistage switch for practicing the present invention.

As shown in FIG. 2, a main controller 4 has a memory 41 for storing the states of the connections of the discrete switches. The memory 41 is divided into an area 411 for storing connection information relating to the overall multistage switch, and an area 412 for storing the states of connections read out of the switch units of the discrete switches.

Each individual switch group of switch groups 21~2R belonging to the secondary switch group 2 is constructed as a 3-stage switch. More specifically, each of the switch groups 21~2R is composed of T discrete switches (where T=p/d) each selectively connecting d incoming lines and s outgoing lines (where d, s are natural numbers and $s \leq p$ holds) and corresponding to a first stage of the 3-stage switch; S discrete switches each selectively connecting t incoming lines and u outgoing lines (where t, u are natural numbers) and corresponding to a second stage of the 3-stage switch; and U discrete switches (where U=q/e) each selectively connecting s incoming lines and e outgoing lines (where s, e are natural numbers and $e \leq q$ holds) and corresponding to a third stage of the 3-stage switch.

Accordingly, here the multistage switch having the switch size of M×N is a switch composed of five stages in all.

A switch thus can be constructed from three of more stages by replacing a portion constructed as a discrete switch by a switch group obtained by dividing a plurality of discrete switches into three stages.

The discrete switches belonging to each of the discrete switch groups have a switch unit for connecting one of a plurality of input terminals and one of a plurality of output terminals, and a switch controller for controlling the switch unit.

By way of example, as shown in FIG. 2, a switch 1K belongs to the primary switch group 1 and incorporates a switch unit 1K1 and a switch controller 1K2. Similarly, a switch 3H belongs to the tertiary switch group 3 and incorporates a switch unit 3H1 and a switch controller 3H2.

The secondary switch group 2 has switches 2A11, 2A1C, 2A1T corresponding to a first stage of switch group 2A, switches 2A21, 2A2B, 2A2S corresponding to a second stage of switch group 2A and switches 2A31, 2A3F, 2A3U corresponding to a third stage of switch group 2A.

The switches 2A11, 2A1C, 2A1T have switch units 2A111, 2A1C1, 2A1T1, respectively, and switch controllers 2A112, 2A1C2, 2A1T2, respectively; the switches 2A21, 2A2B, 2A2S have switch units 2A211, 2A2B1, 2A2S1, respectively, and switch controllers 2A212, 2A2B2, 2A2S2, respectively; and the switches 2A31, 2A3F, 2A3U have switch units 2A311, 2A3F1, 2A3U1, respectively, and switch controllers 2A312, 2A3F2, 2A3U2, respectively.

The switch controller 1K2 of switch 1K is connected to the main controller 4 by a control line 62. The switch controllers of the other discrete switches are connected to the main controller 4 by control lines in a similar manner.

The manner in which input and output terminals of each discrete switch are connected will be described with reference to FIG. 2.

An ath ($1 \leq a \leq r$) output terminal 1Kao of the Kth ($1 \leq K \leq P$) switch 1K of primary switch group 1 is connected to a kth ($1 \leq k \leq p$) input terminal 2Aki of the Ath ($1 \leq A \leq R$) switch group 2A of secondary switch group 2 by a signal line 51. An hth ($1 \leq h \leq q$) output terminal 2Aho of this switch group 2A is connected to an ath ($1 \leq a \leq r$) input terminal 3Hai of the hth ($1 \leq H \leq Q$) switch 3H of tertiary switch group 3 by a signal line 53.

In a case where reference is made to FIG. 1, the output terminals 1~r of the 1st switch 11 of the primary switch group 1 are connected to the first input terminals of the 1st~rth switch groups 21~2R, respectively, of the secondary switch group 2.

Similarly, the output terminals 1~q of the first switch group 21 in secondary switch group 2 are connected to the first input terminals of the switches 31~3Q, respectively, of tertiary switch group 3. Thus, the output terminals of each discrete switch are cross-connected to the input terminals of the switches of the next stage.

Figure 3:
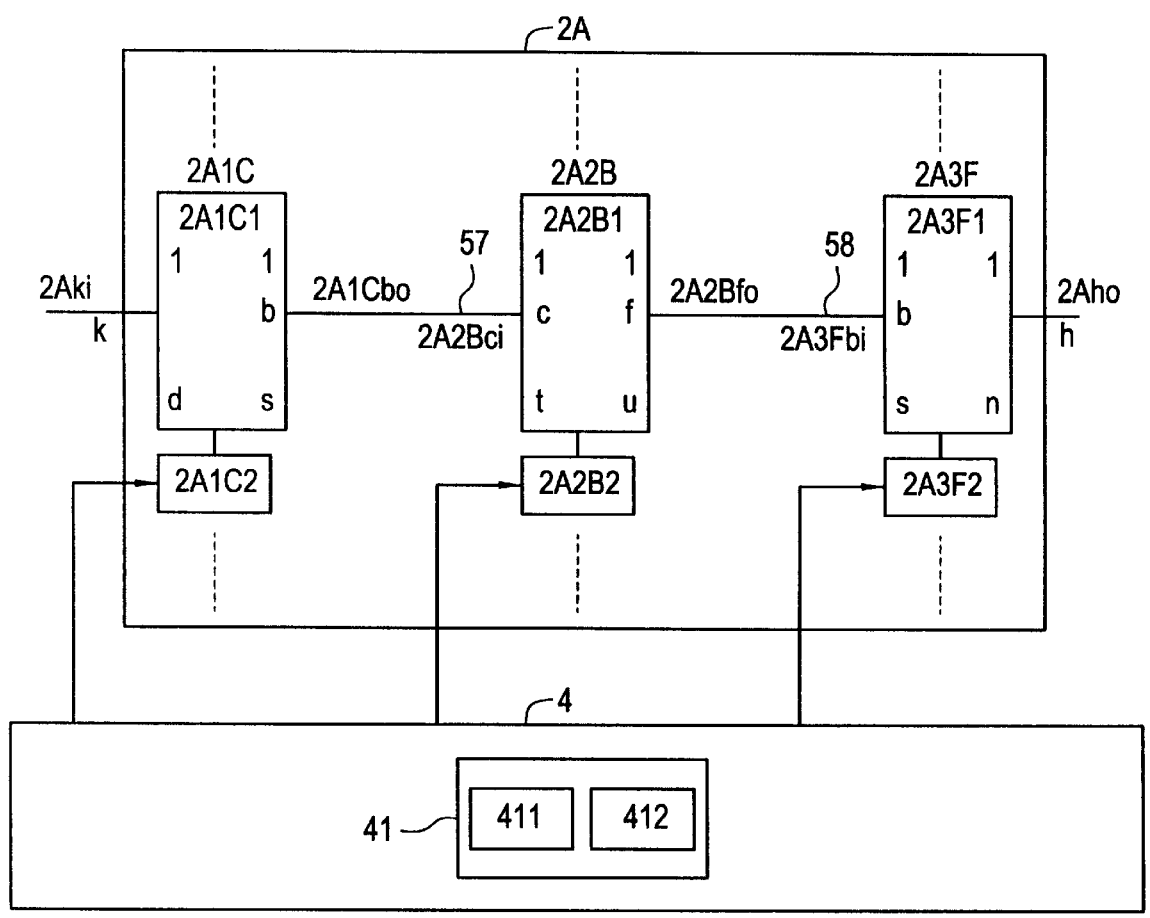
FIG. 3 is a diagram useful in describing the details of construction of a multistage switch for practicing the present invention.

FIG. 3 is a diagram schematically showing an example of connections in a switch group contained in the secondary switch group 2 of this embodiment. Reference will be had to FIG. 3 to describe the connections in a given switch group within the secondary switch group.

A bth ($1 \leq b \leq s$) output terminal 2A1Cbo of a Cth ($1 \leq C \leq T$) switch 2A1C of the first stage in the Ath switch group 2A of the secondary switch group 2 is connected by a signal line 57 to a cth ($1 \leq c \leq t$) input terminal 2A2Bci of a Bth ($1 \leq B \leq S$) switch 2A2B of the second stage, and an fth ($1 \leq f \leq u$) output terminal 2A2Bfo of this switch 2A2B is connected by a signal line 58 to a bth input terminal 2A3Fbi of an Fth ($1 \leq F \leq U$) switch 2A3F of the third stage.

With reference to the first switch group 21 of the secondary switch group shown in FIG. 1, output terminals 1~s of the first switch 2111 of the first stage of switch group 21 are connected to the first input terminals of 1st~sth switches 2121~212S, respectively, of the second stage. Similarly, output terminals 1~u of the first switch 2121 of the second stage of switch group 21 are connected to the first input terminals of switches 2131~213U, respectively, of the third stage. Thus, the output terminals of each discrete switch are cross-connected to the input terminals of the switches of the next stage even in the 3-stage switch within each discrete switch group belonging to the secondary switch group 2.

(2) Operation

The operation of this embodiment of the present invention will now be described in detail with reference to the drawings.

A case will be described in which there is a request to connect an input terminal X (where $X \leq M$) and an output terminal Y (where $Y \leq N$) of the overall multistage switch.

A method of connecting a path will be described first.

The main controller 4 receives a connection request and responds by computing that the input terminal X corresponds to an input terminal α of the Kth switch 1K of primary switch group 1 and that output terminal Y corresponds to an output terminal β of the Hth switch 3H of tertiary switch group 3. Next, the main controller 4 retrieves the status of use of output terminal β of switch 3H from the area 411 of memory 41 and executes the following processing based upon the results of retrieval:

(1) In a case where the output terminal β of switch 3H is currently in use, an input terminal of the multistage switch that will make the connection to β (or Y) is retrieved. If the retrieved input terminal is X, the status is made "already connected" because the path for which connection was requested has already been connected. If the retrieved input terminal is different from X, then the status is made "connection impossible".

(2) In a case where the output terminal β of switch 3H is not in use, the main controller 4 retrieves from the area 411 of memory 41 the states of use of output terminals 1~r of switch 1K of primary switch group 1 successively starting from the first output terminal.

For example, if 1st (a-1)th output terminals of switch 1K are in use and the ath output terminal 1Kao is not in use, the main controller 4 next retrieves the status of use of the hth output terminal 2Aho of switch group 2A of secondary switch group 2 connected to switch 3H of tertiary switch group 3 to which output terminal β belongs.

If the output terminal 2Aho is in use, the main controller 4 retrieves the status of use of the bth (a<b) output terminal 1Kbo of switch 1K. If the output terminal 1Kbo is not in use, the main controller 4 next retrieves the status of use of the hth output terminal 2Bho of switch group 2B connected to switch 3H. The main controller 4 continues executing the above-described processing until a usable output terminal of a primary switch and a usable output terminal of a secondary switch are found.

If the output terminal 2Aho is not in use, the main controller 4 next retrieves a path capable of being set within the switch group 2A. In FIG. 3 the main controller 4 retrieves the states of use of 1st~sth output terminals of the Cth switch 2A1C of the first stage of switch group 2A to which the input terminal 2Aki belongs.

For example, if 1st~(b-1)th output terminals of switch 2A1C are in use and the bth output terminal 2A1Cbo is not in use, the main controller 4 next retrieves the status of use of the fth output terminal 2A2Bfo of switch group of the second stage connected to switch 2A3F of the third stage to which output terminal 2Aho belongs.

If the output terminal 2A2Bfo is in use, the main controller 4 retrieves the status of use of the (b+1)th output terminal 2A1C(b+1)o of switch 2A1C. If the output terminal 2A1C(b+1)o is not in use, the main controller 4 next retrieves the status of use of the fth output terminal 2A(B+1)fo of switch 2A2(B+1) of the second stage connected to switch 2A3F of the third stage to which the output terminal 2Aho belongs. The main controller 4 continues executing the above-described processing until usable output terminals of first and second stages are found.

If the output terminal 2A2Bfo is not in use, on the other hand, the main controller 4 connects the input terminal 1Kαi and the output terminal 1Kao of switch 1K in primary switch group 1; connects the input terminal 2Aki and the output terminal 2A1Cbo of switch 2A1C of the first stage of switch group 2A in the secondary switch group 2; connects the input terminal 2A2Bci and the output terminal 2A2Bfo of switch 2A2B of the second stage of switch group 2A; connects the input terminal 2A3Fbi and the output terminal 2Aho of switch 2A3F of the third stage of switch group 2A; and connects the input terminal 3Hai and the output terminal 3H βo of switch 3H in tertiary switch group 3. As a result, a path connecting the input terminal X and the output terminal Y of the multistage switch can be acquired. Accordingly, instructions for connecting the above-mentioned input and output terminals are transmitted to the switch controllers of the discrete switches in each of the stages.

More specifically, the main controller 4 transmits an instruction for connecting input terminal 1Kαi and output terminal 1Kao to the switch controller 1K2 of switch 1K; transmits an instruction for connecting input terminal 2Aki and output terminal 2A1Cbo to the switch controller 2A1C2 of switch 2A1C; transmits an instruction for connecting input terminal 2A2Bci and output terminal 2A2Bfo to the switch controller 2A2B2 of switch 2A2B; transmits an instruction for connecting input terminal 2A3Fbi and output terminal 2Aho to the switch controller 2A3F2 of switch 2A3F; and transmits an instruction for connecting input terminal 3Hai and output terminal 3Hαo to the switch controller 3H2 of switch 3H.

If each discrete switch executes path connection in accordance with the connection instruction received from the main controller 4 and connects the input and output terminals normally, then each discrete switch sends a signal indicative of "normal end" back to the main controller 4.

Upon receiving the signals indicative of "normal end", the main controller 4 stores the switch numbers of the aforesaid five switches, as well as the input and output terminal numbers of these discrete switches, in the area 411 of the memory 41 as connection information relating to the connection between terminals X and Y of the multistage switch.

If a control line connecting the main controller 4 and the switch controller of a discrete switch is severed or if the switch controller of a discrete switch is reset, then, in order to make the connection information that has been stored in the area 411 of memory 41 of the main controller 4 agree with the connection states of the discrete switches, the main controller 4 overwrites the connection information of area 411 of memory 41 onto the switch controllers of the discrete switches after communication between the main controller 4 and the switch controller of the discrete switch is restored. The switch controller of a discrete switch that has received an overwrite connection instruction from the main controller 4 changes the connection status of the switch unit in accordance with the connection instruction.

In accordance with this mode of practicing the present invention, it is so arranged that when a request has been issued to connect input and output terminals of the overall multistage switch, agreement between the connection information that has been stored in the memory and the states of connections of the switch units of all discrete switches is verified (i) before execution of processing for retrieving a path capable of being established by the switch units of the discrete switches constituting the multistage switch and (ii) before the information that has been stored in the memory is overwritten to the switch units of the discrete switches.

By way of example, operation will be described (a) in a case where a request to connect input terminal X and output terminal Y has been issued, under conditions in which only a path connecting input terminal X and output terminal Y exists in the multistage switch having the switch size of M×N in FIGS. 1 through 3 or (b) in a case where communication failure between the main controller 4 and a switch controller of a discrete switch constituting the multistage switch is restored and the connection information in area 411 of memory 41 is overwritten onto the switch units of the discrete switches.

Before retrieving the path connecting input terminal X and output terminal Y, or before transmitting overwrite connection instructions that are in accordance with the connection information in memory 411 of memory 41 to the switch controllers of the discrete switches, the main controller 4 sends the switch controller of the 1st switch of the primary switch group an instruction for retrieving the input terminal numbers of input terminals to which the 1st~rth output terminals of switch are connected, and for sending back the retrieved results. The main controller 4 then stores the retrieved results, which have been received from the switch controller, in the area 412 of memory 41.

Similarly, the main controller 4 transmits instructions for retrieving (and for sending back the retrieved results) the states of the connections of the switch units of all discrete switches, namely the P discrete switches belonging to the primary switch group, the R discrete switches belonging to the secondary switch group and the Q discrete switches belonging to the tertiary switch group, and stores the received results of retrieval in the area 412 of memory 41.

In the example set forth above, only a path connecting the input terminal X and the output terminal Y exists. Consequently, the states of the connections read out of the switch units of the discrete switches constitute the following information in FIGS. 1 through 3:

input terminal 1K1 α and output terminal 1Kao are currently connected by switch 1K;

input terminal 2Aki and output terminal 2A1Cbo are currently connected by switch 2A1C;

input terminal 2A2Bci and output terminal 2A2Bfo are currently connected by switch 2A2B;

input terminal 2A3Fbi and output terminal 2Aho are currently connected by switch 2A3F; and input terminal 3Hai and output terminal 3Hβo are currently connected by switch 3H.

Using the above-mentioned connection information, the main controller 4 retrieves the fact that the output terminal 3Hβo of switch 3H of the tertiary switch group corresponds to the output terminal Y of the overall multistage switch $[Y=(H-1) \times n+\beta]$ and, on the basis of the status of the connection in switch 3H, reads out the fact that the output terminal 3Hβo is currently connected to the input terminal 3Hai.

Next, the main controller 4 retrieves the fact that the input terminal 3Hai of switch 3H is to be logically connected to the output terminal 2Aho of switch 2A of the secondary switch group 2, and retrieves the fact that output terminal 2Aho corresponds to the output terminal 2Aho of the switch 2A3F of the third stage of the secondary switch group.

Next, on the basis of the status of the connection in switch 2A3F, the main controller 4 reads out the fact that the output terminal 2Aho is currently connected to the input terminal 2A3Fbi and retrieves the fact that the input terminal 2A3Fbi is to be logically connected to the output terminal 2A2Bfo of the switch 2A2B of the second stage.

Next, on the basis of the status of the connection in switch 2A2B, the main controller 4 reads out the fact that the output terminal 2A2Bfo is currently connected to the input terminal 2A2Bci and retrieves the fact that the input terminal 2A2Bci is to be logically connected to the output terminal 2A1Cbo of the switch 2A1C of the first stage.

Next, on the basis of the status of the connection in switch 2A, the main controller 4 retrieves the fact that the output terminal 2A1Cbo is currently connected to the input terminal 2Aki and retrieves the fact that the input terminal 2Aki of the switch 2A in the secondary switch group 2 is to be logically connected to the output terminal 1Kao of switch 1K in the primary switch group 1.

Next, on the basis of the status of the connection in switch 1K, the main controller 4 retrieves the fact that the output terminal 1Kao is currently connected to the input terminal 1Kai and retrieves the fact that the input terminal 1Kai of switch 1K corresponds to the input terminal X $[X=(K-1)\times m+\alpha]$ of the overall multistage switch.

The main controller 4 stores the connection information relating to input terminal X and output terminal Y of the overall multistage switch, which information has been retrieved based upon the states of the connections read out of the switch units of the discrete switches, in the area 412 of memory 41, compares the connection information of the overall multistage switch that has been stored in the area 411 of memory 41 beforehand, and checks to determine whether the information in area 411 matches the information stored in area 412.

A preferred embodiment of the present invention now be described in further detail with reference to the drawings.

This embodiment of the present invention will be described in regard to a 3-stage switch having a switch size of N×M for selectively connecting M incoming lines and N outgoing lines, where M and N represent natural numbers. Each switch group of the 3-stage switch has a plurality of discrete switches and each discrete switch possesses a plurality of input terminals and a plurality of output terminals.

Figure 4:
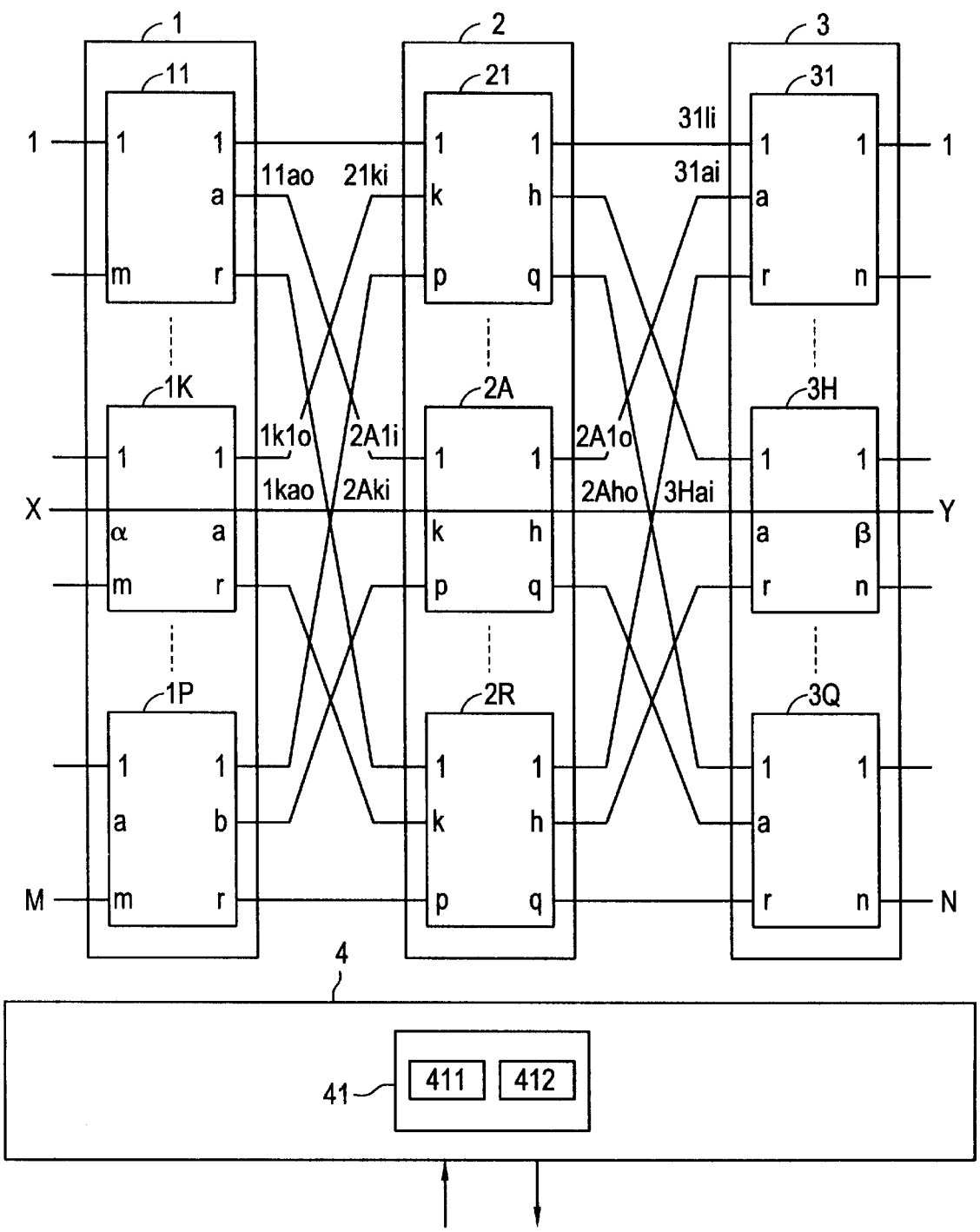
FIG. 4 is a diagram illustrating the connections of signal lines in a multistage switch according to an embodiment of the present invention.

FIG. 4 illustrates an example of the 3-stage switch, which includes P discrete switches (where P=M/m) of switch size m×r each selectively connecting m incoming lines and r outgoing lines (where m, r are natural numbers and m≦M holds) and belonging to the primary switch group 1; R switch groups each selectively connecting p incoming lines and q outgoing lines (where p, q are natural numbers) and belonging to the secondary switch group 2; Q discrete switches (where Q=N/n) each selectively connecting r incoming lines and n outgoing lines (where r, n are natural numbers and n≦N holds) and belonging to the tertiary switch group 3; and the main controller 4 for controlling connections through the primary, secondary and tertiary switches 1, 2 and 3, respectively.

The main controller 4 has the memory 41 for storing the states of the connections of the discrete switches. The memory 41 is divided into the area 411 for storing connection information relating to the 3-stage switch, and the area 412 for storing the states of connections read out of the switch units of the discrete switches.

The discrete switches belonging to each of the discrete switch groups have a switch unit for connecting one of a plurality of input terminals and one of a plurality of output terminals, and a switch controller for controlling the switch unit.

Figure 5:
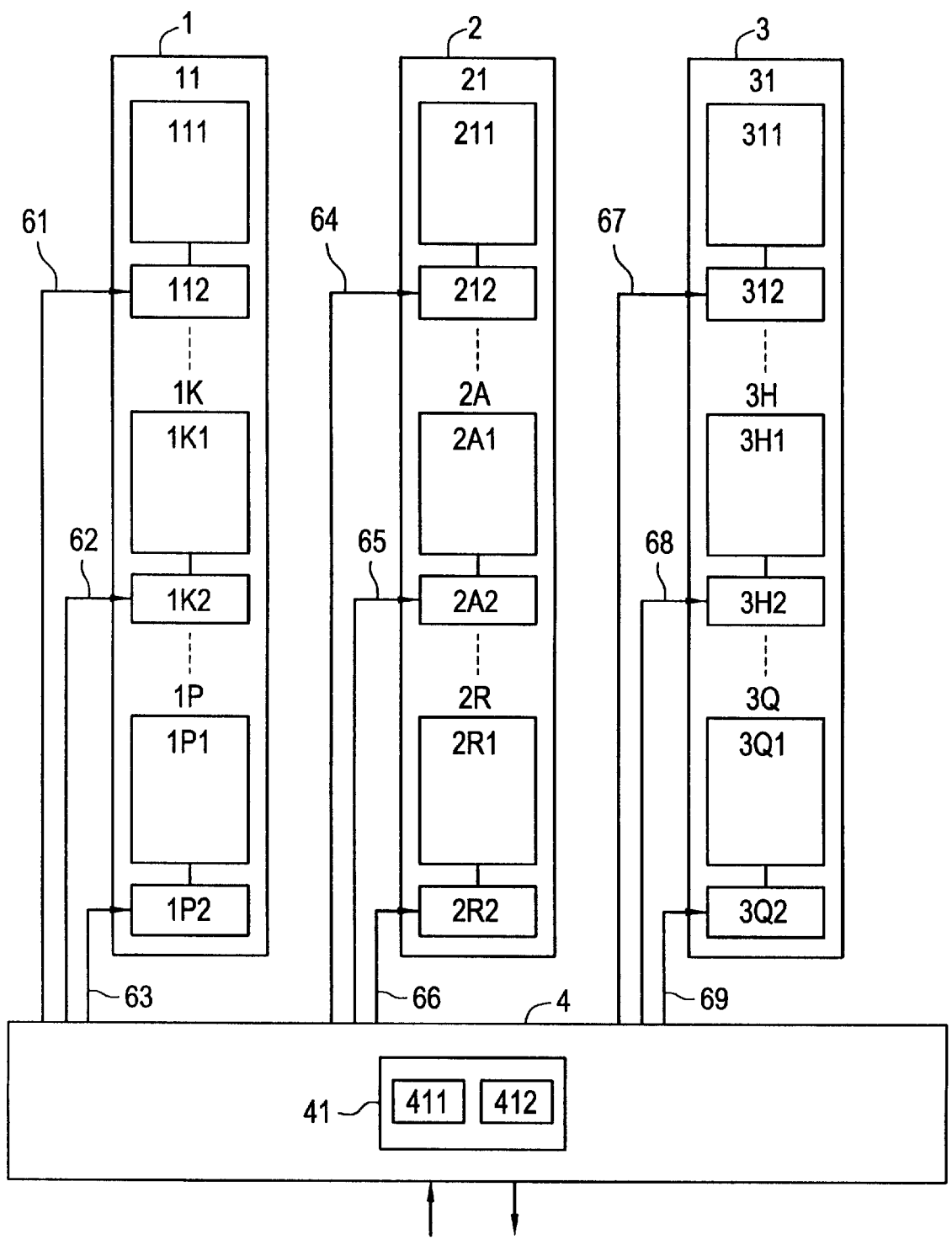
FIG. 5 is a diagram useful in describing the connections of control lines in a multistage switch according to this embodiment of the present invention.

By way of example, as shown in FIG. 5, the switch 1K belongs to the primary switch group 1 and incorporates the switch unit 1K1 and the switch controller 1K2.

Similarly, the secondary switches 2A, 2R which belong to the secondary switch group 2 have switch units 2A1, 2R1, respectively, and switch controllers 2A2, 2R2, respectively. Likewise, the tertiary switches 3H, 3Q which belong to the tertiary switch group 3 have switch units 3H1, 3Q1, respectively, and switch controllers 3H2, 3Q2, respectively.

The switch controller 1K2 of the primary switch 1K is connected to the main controller 4 by the control line 62. The switch controllers of the other discrete switches are connected to the main controller by control lines in a similar manner, as depicted in FIG. 5.

Figure 6:
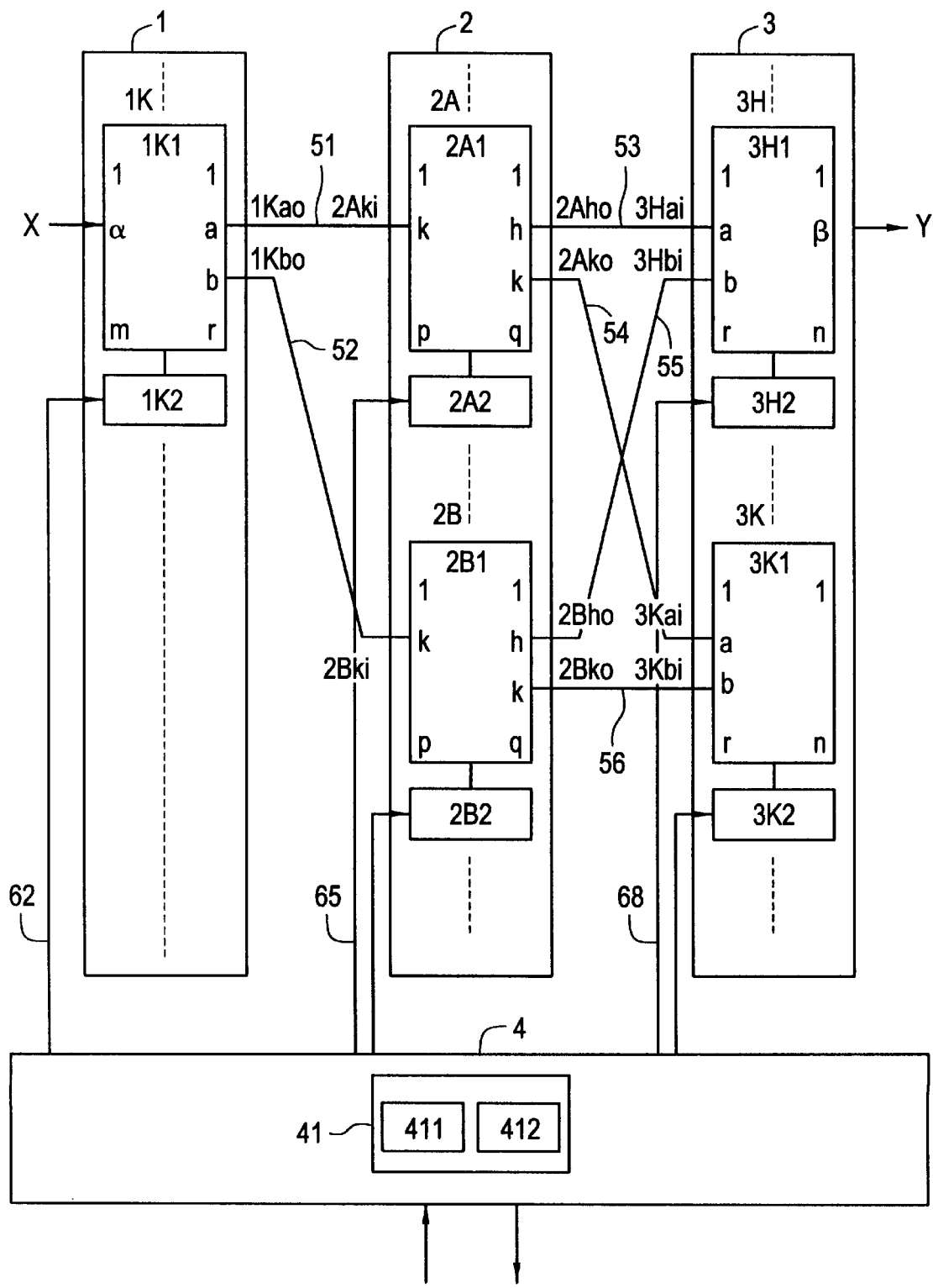
FIG. 6 is a diagram illustrating the construction of this embodiment of the present invention.
Figure 7:
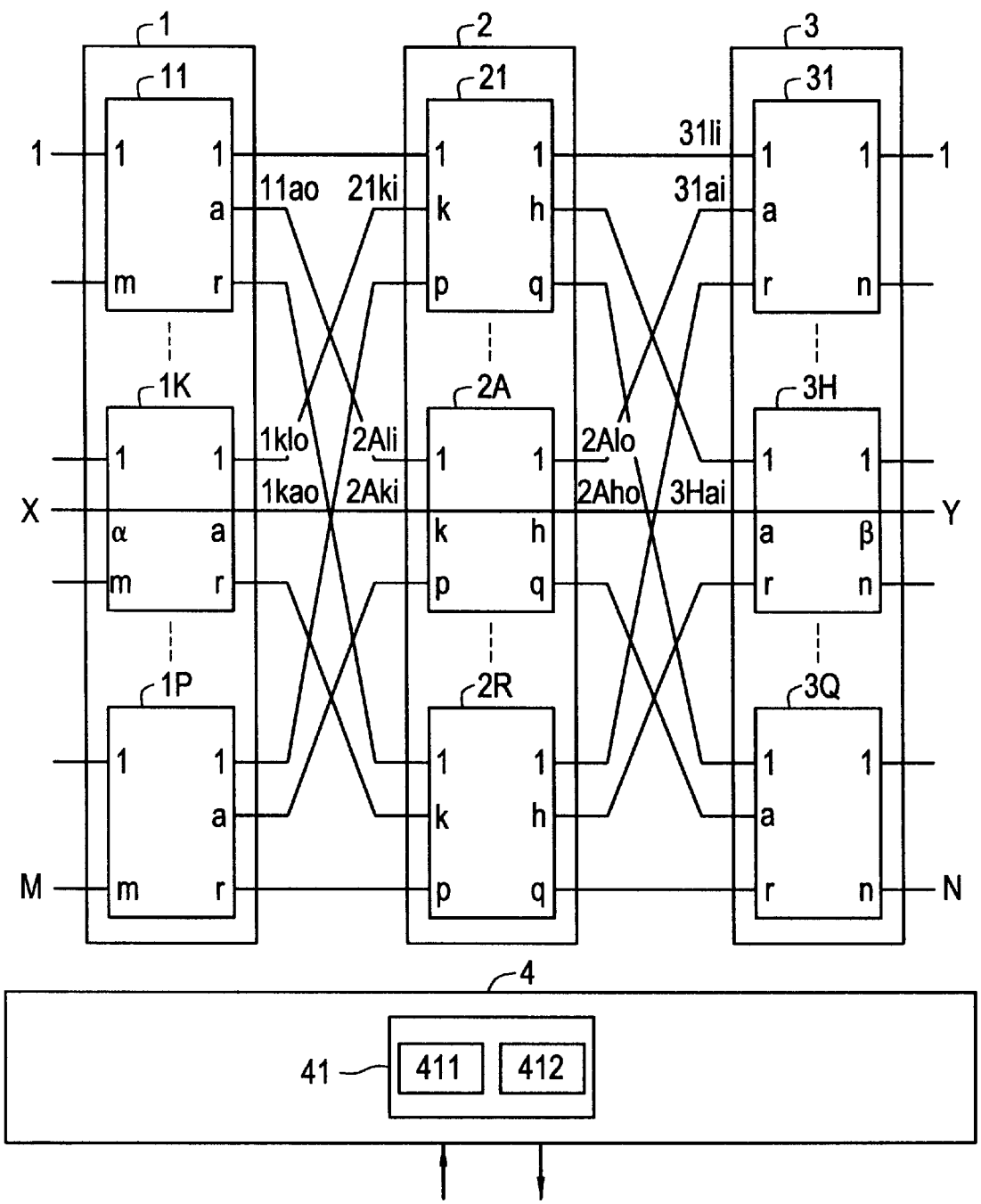
FIG. 7 is a diagram useful in describing the connections of signal lines in a multistage switch according to the system of prior art.
Figure 8:
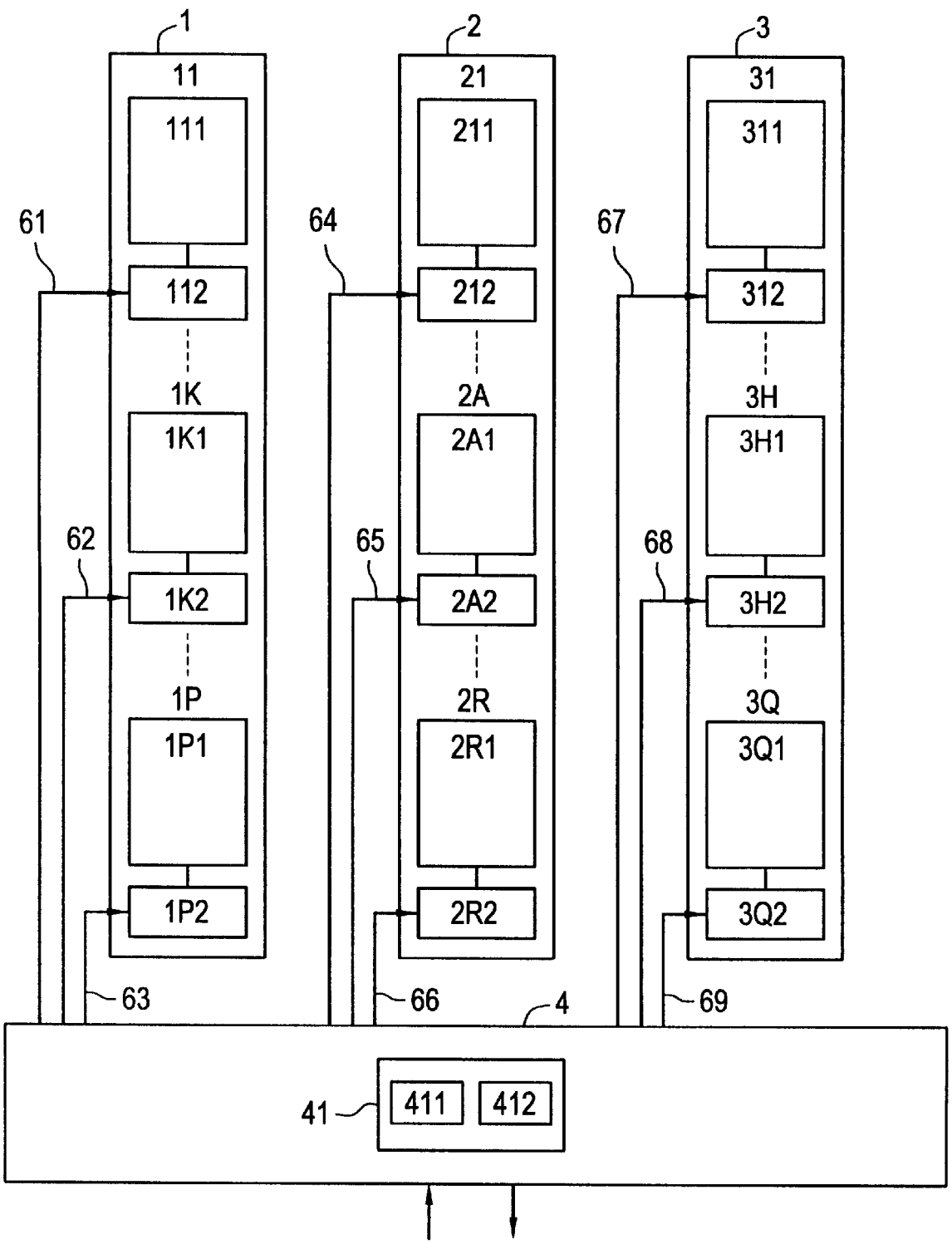
FIG. 8 is a diagram useful in describing the connections of control lines in a multistage switch according to the system of prior art.
Figure 9:
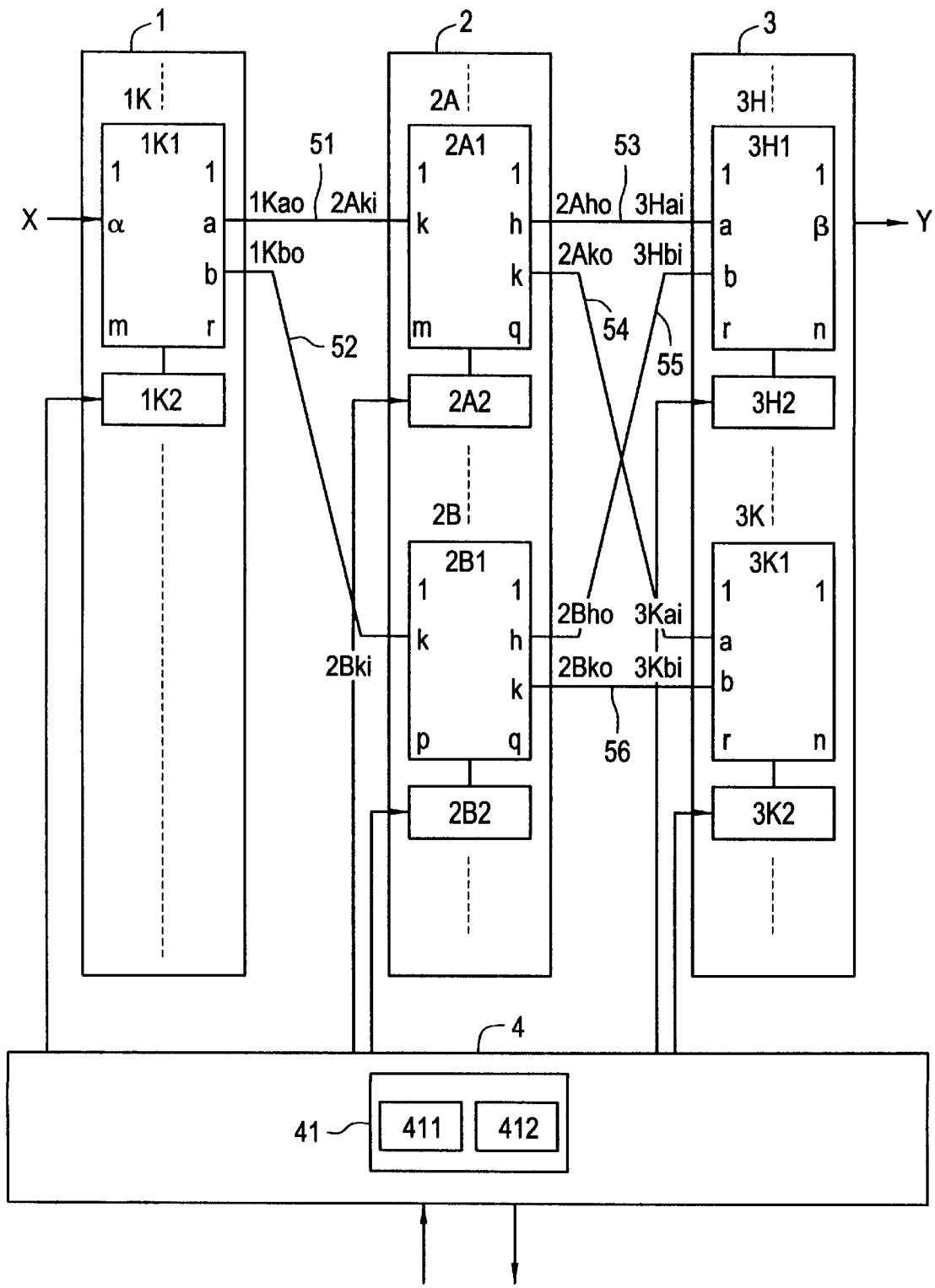
FIG. 9 is a diagram illustrating the details of the conventional system.

The manner in which input and output terminals of each discrete switch are connected will be described with reference to FIG. 6.

An ath ($1 \leq a \leq r$) output terminal 1Kao of the Kth ($1 \leq K \leq P$) switch 1K of primary switch group 1 is connected to a kth ($1 \leq k \leq p$) input terminal 2Aki of the Ath ($1 \leq A \leq R$) switch 2A of secondary switch group 2 by signal line 51. An hth ($1 \leq h \leq q$) output terminal 2Aho of this switch 2A is connected to an ath ($1 \leq a \leq r$) input terminal 3Hai of the hth ($1 \leq H \leq Q$) switch 3H of tertiary switch group 3 by signal line 53.

A kth ($1 \leq k \leq q$) output terminal 2Ako of the switch 2A is connected to an ath input terminal 3Kai of the Kth switch 3K of tertiary switch group 3 by signal line 54.

A bth ($1 \leq b \leq r$) output terminal 1Kbo of the switch 1K is connected to a kth input terminal 2Bki of the Bth ($1 \leq B \leq R$) switch 2B of secondary switch group 2 by signal line 52.

An hth output terminal 2Bho of switch 2B is connected to a bth input terminal 3Hbi of switch 3H by signal line 55, and a kth output terminal 2Bko of switch 2B is connected to a bth input terminal 3Kbi of switch 3K by signal line 56.

Accordingly, as illustrated in FIG. 4, the output terminals 1~r of the first switch 11 in primary switch group 1 are connected to the first input terminals of the 1st~rth switches 21~2R, respectively, of secondary switch group 2.

Similarly, the output terminals 1~q of the first switch 21 in secondary switch group 2 are connected to the first input terminals of the switches 31~3Q, respectively, of tertiary switch group 3.

Thus, the output terminals of each discrete switch are cross-connected to the input terminals of the switches of the next stage.

The operation of this embodiment of the present invention will now be described in detail with reference to the drawings.

A case will be described in which there is a request to connect the input terminal X (where X≦M) and the output terminal Y (where Y≦N) of the overall 3-stage switch.

The manner of path connection will be described first.

The main controller 4 receives a connection request and responds by computing that the input terminal X corresponds to the input terminal α of the Kth switch 1K of primary switch group 1 and that the output terminal Y corresponds to the output terminal β of the Hth switch 3H of tertiary switch group 3. Next, the main controller 4 retrieves the status of use of output terminal β of switch 3H from the area 411 of memory 41 and executes the following processing based upon the results of retrieval:

(1) In a case where the output terminal β of switch 3H is currently in use, an input terminal of the multistage switch that will make the connection to β (or Y) is retrieved. If the retrieved input terminal is X, the status is made "already connected" because the path for which connection was requested has already been connected. If the retrieved input terminal is different from X, then the status is made "connection impossible".

(2) In a case where the output terminal β of switch 3H is not in use, the main controller 4 retrieves from the area 411 of memory 41 the states of use of output terminals 1~r of switch 1K of primary switch group 1 successively starting from the first output terminal.

For example, if 1st~(a−1)th output terminals of switch 1K are in use and the ath output terminal 1Kao is not in use, the main controller 4 next retrieves the status of use of the hth output terminal 2Aho of switch 2A of secondary switch group 2 connected to switch 3H of tertiary switch group 3 to which output terminal β belongs.

If the output terminal 2Aho is not in use, the main controller 4 connects the input terminal 1K αi and the output terminal 1Kao of switch 1K in primary switch group 1; connects the input terminal 2Aki and the output terminal 2Aho of switch 2A of the secondary switch group 2; and connects the input terminal 3Hai and the output terminal 3Hβo of switch 3H in tertiary switch group 3. As a result, a path connecting the input terminal X and the output terminal Y of the 3-stage switch can be acquired. Accordingly, instructions for connecting the above-mentioned input and output terminals are transmitted to the switch controllers of the discrete switches in each of the stages. If each discrete switch executes the connection of the requested path and connects the input and output terminals normally, then each discrete switch sends a signal indicative of "normal end" back to the main controller 4. Upon receiving the signals indicative of "normal end", the main controller 4 saves the established connection information in the area 411 of memory 41.

If the output terminal 2Aho of switch 2A is in use, the main controller 4 retrieves the status of use of the bth (a<b) output terminal 1Kbo of switch 1K. If this output terminal is not in use, the main controller 4 next retrieves the status of use of the hth output terminal 2Bho of switch group 2B connected to switch 3H. The main controller 4 continues executing the above-described processing until a usable output terminal of a primary switch and a usable output terminal of a secondary switch are found.

If a control line connecting the main controller 4 and the switch controller of a discrete switch is severed or if the switch controller of a discrete switch is reset, then, in order to make the connection information that has been stored in the area 411 of memory 41 of the main controller 4 agree with the connection states of the discrete switches, the main controller 4 overwrites the connection information the memory onto the discrete switches after communication between the main controller and the switch controller of the discrete switch is restored. The switch controller of a discrete switch that has received an overwrite connection instruction from the main controller 4 changes the connection status of the switch unit in accordance with the connection instruction.

In this embodiment of the present invention, it is so arranged that when a request has been issued to connect input and output terminals of the overall 3-stage switch, agreement between the connection information that has been stored in the memory and the states of connections of the switch units of all discrete switches is verified before execution of processing for retrieving a path capable of being established by the switch units of the discrete switches constituting the 3-stage switch and before the information that has been stored in the memory is overwritten to the switch units of the discrete switches.

By way of example, operation will be described in a case where a request to connect input terminal X and output terminal Y has been issued, or in a case where communication failure between the main controller 4 and a switch controller of a discrete switch constituting the multistage switch is restored and the connection information in area 411 of memory 41 is overwritten onto the switch units of the discrete switches, under conditions in which only a path connecting input terminal X and output terminal Y exists in the 3-stage switch having the switch size of M×N in FIGS. 4 through 6.

Before retrieving a path connecting input terminal X and output terminal Y, or before transmitting overwrite connection instructions that are in accordance with the connection information in memory 411 of memory 41 to the switch controllers of the discrete switches, the main controller 4 sends the switch controller 112 of the 1st switch 11 of the primary switch group an instruction for retrieving the input terminal numbers of input terminals to which the 1st~rth output terminals of switch 111 are connected, and for sending back the retrieved results. The main controller 4 then stores the retrieved results, which have been received from the switch controller 112, in the area 412 of memory 41.

In the example set forth above, only a path connecting the input terminal X and the output terminal Y exists. Consequently, the states of the connections read out of the switch units of the discrete switches comprises the following information in FIGS. 4 through 6:

input terminal 1K$\alpha$i and output terminal 1K$\alpha$o are currently connected by switch 1K;

input terminal 2Aki and output terminal 2Aho are currently connected by switch 2A; and input terminal 3Hai and output terminal 3H$\beta$o are currently connected by switch 3H.

Using the above-mentioned connection information, the main controller 4 retrieves the fact that the output terminal 311$\beta$o of switch 3H of the tertiary switch group corresponds to the output terminal Y of the overall multistage switch [Y=(H−1)×n+$\beta$] and, on the basis of the status of the connection in switch 3H, reads out the fact that the output terminal 3H$\beta$o is currently connected to the input terminal 3Hai.

Next, the main controller 4 retrieves the fact that the input terminal 3Hai of switch 3H is to be logically connected to the output terminal 2Aho of switch 2A of the secondary switch group, and retrieves the fact that output terminal 2Aho currently connected to the input terminal 2Aki of the switch 2A of the secondary switch group.

Next, the main controller 4 retrieves the fact that the input terminal 2Aki of switch 2A is to be logically connected to the output terminal 1Kao of switch 1K of the primary switch group, retrieves, on the basis of the status of the connection in switch 1K, the fact that the output terminal 1Kao is currently connected to the input terminal 1Ka1, and retrieves the fact that the input terminal 1Kai of switch 1K corresponds to the input terminal X [X=(K−1)Xm+$\alpha$] of the overall multistage switch.

The main controller 4 stores the connection information relating to input terminal X and output terminal Y of the overall 3-stage switch, which information has been retrieved based upon the states of the connections read out of the switch units of the discrete switches, in the area 412 of memory 41, compares the connection information of the overall multistage switch that has been stored in the area 411 of memory 41 beforehand, and checks to determine whether the information in area 411 matches the information stored in area 412.

The present invention offers the following advantages:

(1) The first advantage of the present invention is that it is possible to prevent a connection path established for each discrete switch from being cut when there is a request to connect input and output terminals of a multistage switch under conditions in which there is no agreement between connection information of the overall multistage switch that has been stored in memory and the connection states that have been set for the switch units of the discrete switches. The reason for this is that when the connection of a new path has been requested, the present invention is such that it is possible to verify, prior to the execution of path connection processing, whether the multistage-switch connection information that has been stored in memory beforehand coincides with the states of the connections through the discrete switches.

(2) The second advantage of the present invention is that it is possible to prevent the severance of a connected path. Specifically, if a control line connecting the main controller and the switch controller of a discrete switch has been cut, or if the switch controller of a discrete switch has been reset, the connection information in the memory of the main controller is generally overwritten as to the discrete switches, after communication between the main controller and switch controller is restored, in order to match the connection information that has been stored in the memory with the connection states of the switch units of the discrete switches. However, the system of the present invention for checking the connection information of the multistage switch is so adapted that it is possible to prevent a connection path from being cut by the overwriting of the connection information and establishing of a new path under conditions in which there is no agreement between connection information of the overall multistage switch that has been stored in memory and the connection states that have been set for the switch units of the discrete switches. The reason for this is that it is possible to verify agreement between the connection information of the overall multistage switch that has been stored in memory and the connection states of the discrete switches before overwriting starts following restoration of communication between the main controller and the switch controller.

As many apparently widely different embodiments of the present invention can be made without departing from the spirit and scope thereof, it is to be understood that the invention is not limited to the specific embodiments thereof except as defined in the appended claims.

What is claimed is:

1. A system of checking information relating to connections of a multistage switch, wherein said multistage switch includes:

a switch section having an M×N switch size selectively connecting M incoming lines and N outgoing lines (where M, N are natural numbers) and consisting of S stages (where S is a natural number) of discrete switches, wherein output terminals 1~P (where P is a natural number) of discrete switches of a Kth (where K is a natural number) preceding stage are permanently cross-connected to Kth input terminals of 1st~Pth discrete switches of a succeeding stage in accordance with a prescribed rule, whereby the discrete switches are connected together;

a memory for storing connection information relating to each discrete switch and to the multistage switch, and a main controller which, in response to a request to the multistage switch for connection of a path connecting an input terminal having an input terminal number a and an output terminal having an output terminal number b (where $a \leq M$, $b \leq N$), retrieves, based upon said stored connection information, states of use of input terminal numbers and of output terminal numbers of each of the discrete switches and retrieves a connectable connection path through the multistage switch, transmits connection instructions to switch controllers of respective ones of the discrete switches based upon results of retrieval, receives results of execution of path connection from the switch controllers of the discrete switches, and updates said stored connection information, based upon the results of execution received;

said multistage switch of switch size M×N being composed of discrete switches each having a switch size of mS×nS (where $mS \leq M$, $nS \leq N$) selectively connecting mS incoming lines and nS outgoing lines (where mS, nS are natural numbers);

each discrete switch including a switch unit of the switch size mS×nS, and a switch controller for managing connection information of said switch unit, receiving a connection instruction from said main controller and transmitting results of connection to said main controller via a control line connected to said main controller;

said system comprising:

means for causing said switch controller of each discrete switch to retrieve an input terminal number mS of an input terminal that is connected to an output terminal of an output terminal number nS of the switch unit, retrieve input terminal numbers of connected input terminals with regard to all output terminals of the switch unit and adopt results of retrieval as the connection state information of said each discrete switch;

means for causing said main controller to read the connection states of each of the discrete switches constituting the M×N multistage switch out of the switch controllers of all of the discrete switches, and retrieve, based upon the connection states of each of the discrete switches, the input terminal number a of the input terminal of the multistage switch that is connected to the output terminal number b of the output terminal of the multistage switch, as well as a connection path, by utilizing the fact that an output terminal of a switch in a cth (where $c \leq S-1$) stage is capable of being logically connected to an input terminal of a switch in a (c+1)th stage;

means for causing said main controller to repeat processing for retrieval of input terminal numbers of connected input terminals and connection paths with regard to all output terminals of the multistage switch, and generate connection information relating to the overall multistage switch based upon results of retrieval; and means for causing said main controller to compare the connection information of the overall multistage switch retrieved and generated based upon the connection state of each discrete switch with said stored connection information.

2. A system of checking connection information of a multistage switch having an M×N switch size selectively connecting M incoming lines and N outgoing lines (where M, N are natural numbers) and having S stages (where S is a natural number) of discrete switches, wherein the discrete switches are permanently cross-connected in accordance with a prescribed rule, said system comprising:

means for retrieving connection information of the overall multistage switch that has been stored in a memory storing connection information relating to each discrete switch and to the overall multistage switch, as well as connection states of switch units of each of the discrete switches;

means for generating connection information of the overall switch from results of retrieval by utilizing the fact that an output terminal of a switch in a cth (where $c \leq S-1$) stage of the multistage switch is to be logically connected to an input terminal of a switch in a (c+1)th stage; and means for comparing the generated connection information of the overall multistage switch and said stored connection information;

wherein a connection path that has been set for each discrete switch based on a result of comparing the generated connection information of the overall multistage switch and said stored connection information is prevented from being severed accidentally.

3. The system as defined in claim 2, wherein said discrete switches are grouped in N switch units, each switch unit comprising M switches, each of M switches having a switch controller that communicates each switch to a main controller, said main controller having said memory.

4. A method of checking information relating to connections of a multistage switch, the method comprising:

providing a multistage switch comprising:

a switch section having an M×N switch size selectively connecting M incoming lines and N outgoing lines (where M, N are natural numbers) and consisting of S stages (where S is a natural number) of discrete switches, wherein output terminals 1~P (where P is a natural number) of discrete switches of a Kth (where K is a natural number) preceding stage are permanently cross-connected to Kth input terminals of $1^{st}$~Pth discrete switches of a succeeding stage in accordance with a prescribed rule, whereby the discrete switches are connected together;

a memory for storing connection information relating to each discrete switch and to the multistage switch, and a main controller which, in response to a request to the multistage switch for connection of a path connecting an input terminal having an input terminal number a and an output terminal having an output terminal number b (where a≦M, b≦N), retrieves, based upon the connection information that has been stored in said memory, states of use of input terminal numbers and of output terminal numbers of each of the discrete switches and retrieves a connectable connection path through the multistage switch, transmits connection instructions to switch controllers of respective ones of the discrete switches based upon results of retrieval, receives results of execution of path connection from the switch controllers of the discrete switches, and updates the connection information, which has been stored in said memory, based upon the results of execution received;

said multistage switch of switch size M×N being composed of discrete switches each having a switch size of mS×nS (where mS≦M, nS≦N) selectively connecting mS incoming lines and nS outgoing lines (where inS, nS are natural numbers);

each discrete switch including a switch unit of the switch size mS×nS, and a switch controller for managing connection information of said switch unit, receiving a connection instruction from said main controller and transmitting results of connection to said main controller via a control line connected to said main controller;

said method further comprising the steps of:

causing said switch controller of each discrete switch to retrieve an input terminal number mS of an input terminal that is connected to an output terminal of an output terminal number nS of the switch unit, retrieve input terminal numbers of connected input terminals with regard to all output terminals of the switch unit and adopt results of retrieval as the connection information of the discrete switch;

causing said main controller to read the connection states of each of the discrete switches constituting the M×N multistage switch out of the switch controllers of all of the discrete switches, and retrieve, based upon the connection states of each of the discrete switches, the input terminal number a of the input terminal of the multistage switch that is connected to the output terminal number b of the output terminal of the multistage switch, as well as a connection path, by utilizing the fact that an output terminal of a switch in a cth (where c≦S−1) stage is capable of being logically connected to an input terminal of a switch in a (c+1)th stage;

causing said main controller to repeat processing for retrieval of input terminal numbers of connected input terminals and connection paths with regard to all output terminals of the multistage switch, and generate connection information relating to the overall multistage switch based upon results of retrieval; and causing said main controller to compare the connection information of the overall multistage switch retrieved and generated based upon the connection state of each discrete switch with said stored connection information.

5. A method of checking connection information of a multistage switch having an M×N switch size selectively connecting M incoming lines and N outgoing lines (where M, N are natural numbers) and having of S stages (where S is a natural number) of discrete switches, wherein the discrete switches are permanently cross-connected in accordance with a prescribed rule, said method comprising the steps of:

retrieving connection information of the overall multistage switch that has been stored in a memory storing connection information relating to each discrete switch and to the overall multistage switch, as well as connection states of switch units of each of the discrete switches;

generating connection information of the overall switch from results of retrieval by utilizing the fact that an output terminal of a switch in a cth (where c≦S−1) stage of the multistage switch is to be logically connected to an input terminal of a switch in a (c+1)th stage;

comparing the generated connection information of the overall multistage switch and said stored connection information; and establishing a connection path for each discrete switch based on a result of said comparing step without accidentally severing existing connection or connections.

* * * * *

UNITED STATES PATENT AND TRADEMARK OFFICE
CERTIFICATE OF CORRECTION

PATENT NO. : 6,118,781
DATED      : September 12, 2000
INVENTOR(S) : Yasuharu SEKINE It is certified that error appears in the above-identified patent and that said Letters Patent is hereby corrected as shown below:

Column 1, line 56, delete "he" insert --the--.

Column 10, line 61, delete "α" insert --B--

Signed and Sealed this

First Day of May, 2001

Attest:

NICHOLAS P. GODICI

*Attesting Officer*          *Acting Director of the United States Patent and Trademark Office*